June 22, 1954

A. LONGACRE 2,682,048

RADIO OBJECT DETECTION APPARATUS

Filed April 7, 1945

INVENTOR.
ANDREW LONGACRE
BY
William D. Hall,
ATTORNEY

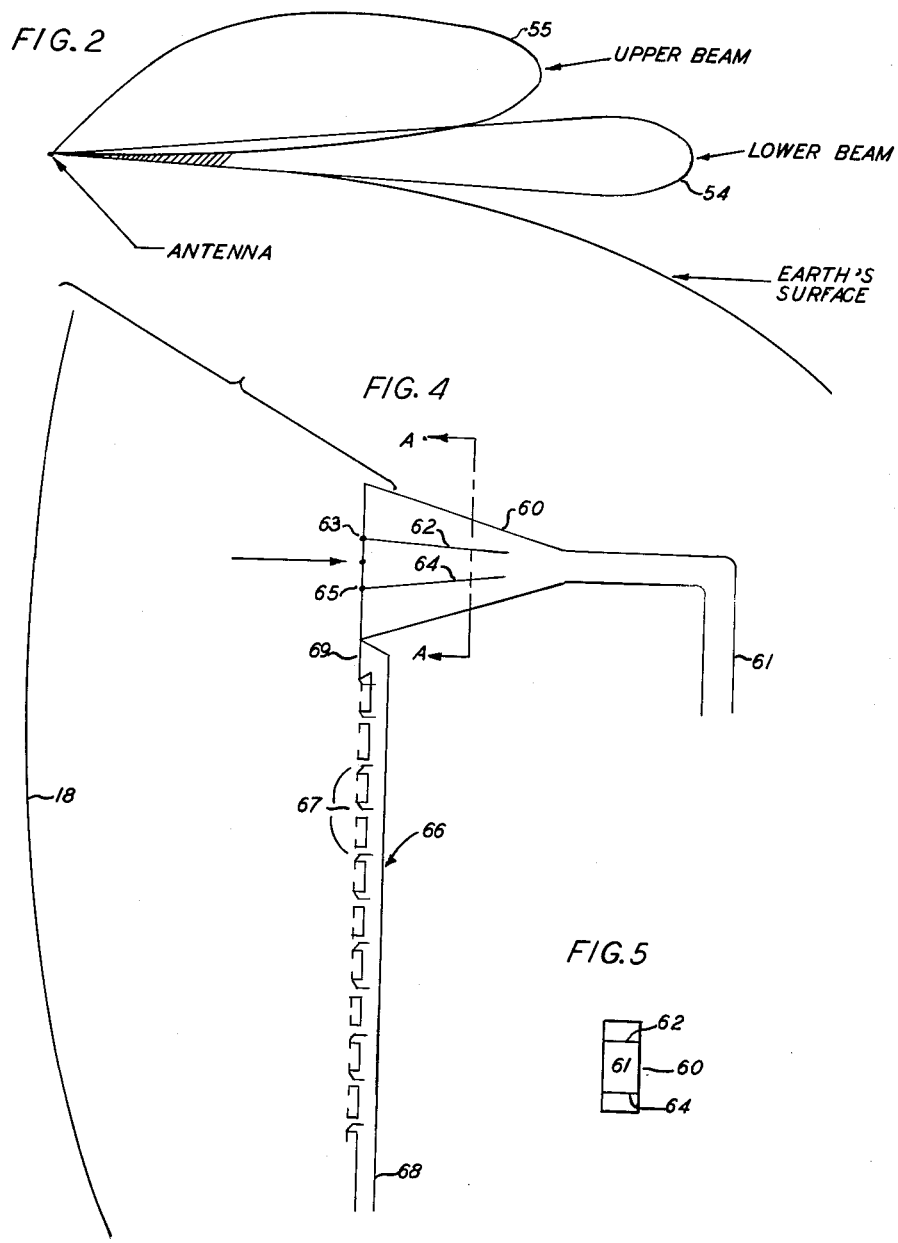

Patented June 22, 1954

2,682,048

UNITED STATES PATENT OFFICE 2,682,048

RADIO OBJECT DETECTION APPARATUS

Andrew Longacre, Exeter, N. H., assignor to the United States of America as represented by the Secretary of War Application April 7, 1945, Serial No. 587,192

7 Claims. (Cl. 343—17.1)

This invention relates generally to electrical apparatus and more particularly to a radio object detection apparatus in which ground clutter is reduced.

In one method of radio object detection, an area in space is searched by a beam of radio pulses. Objects intercepting the beam reflect or reradiate the radio energy and cause echoes to be received by the detection apparatus and indicated on the display means thereof.

If one scanning radio beam, wide in elevation and closely grazing the earth's surface, is used, the detection apparatus will have maximum sensitivity for low flying and distant planes but targets near the apparatus will be obscured by the echoes reflected from trees, buildings, and other objects on the ground. Such obscuring echoes are known as ground clutter. If the beam is elevated, the ground clutter will tend to disappear but the apparatus will lose its response for low flying or distant planes.

One object of this invention is to provide a radio object detection system in which ground clutter is reduced. Another object is to arrange said system so that maximum sensitivity is retained for low flying or distant targets. Another object is to increase the power emitted by such apparatus.

In accordance with this invention, there is provided a radio object detection system employing a plurality of radio beams. Reflections of the lower beam by objects near the transmitter may be excluded from the display means.

Other objects, features, and advantages of this invention will suggest themselves to those skilled in the art and will become apparent from the following description of the invention taken in connection with the accompanying drawing in which:

Fig. 2 is a cross section of the beam pattern used by the system of this invention;

Fig. 4 is an elevational view in cross section of one type of double-beam antenna which may be used in the system of this invention; and Fig. 5 is a sectional view taken on line A—A of Fig. 4.

Figure 1:
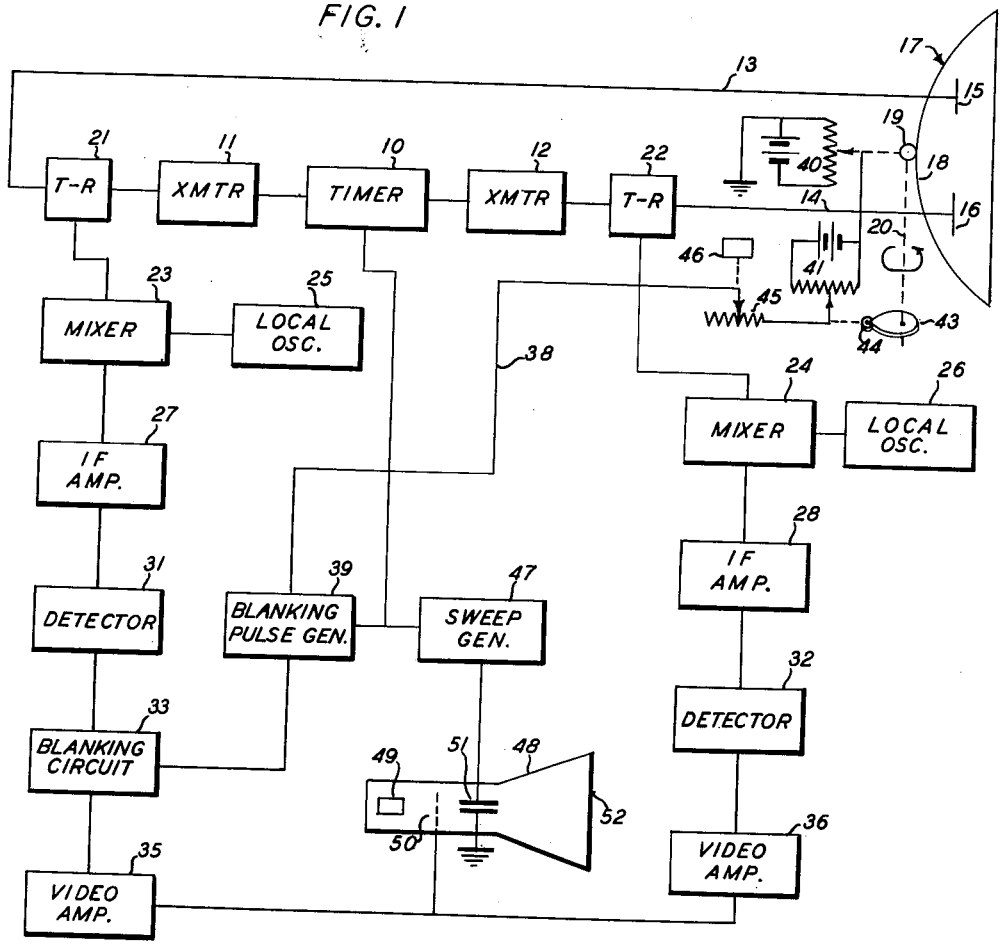
Fig. 1 is a block diagram of a system embodying the principles of this invention.

Referring now more particularly to the embodiment of this invention set forth in Fig. 1, a timer 10 controls the operation of transmitter 11 so that it supplies short pulses of radio-frequency energy through transmit-receive (T-R) switch 21 and line 13 to radiating element 15 of antenna 17. Timer 10 controls the operation of transmitter 12 so that it supplies short pulses of radio-frequency energy through T-R switch 22 to radiating element 16 of antenna 17. Element 15 is arranged above element 16 and the radiations of each are reflected by paraboloidal reflector 18, which is pivoted at 19 to be angularly adjustable in elevation. Reflector 18 is also pivoted to rotate in azimuth about axis 20. The beam initiated by element 15 is thus caused to lie in space below the beam initiated by antenna 16. In this embodiment transmitter 11 produces radio energy of one frequency and transmitter 12 produces radio energy of another frequency. Timer 10 causes both transmitters to produce pulses simultaneously.

T-R switch 22, which is connected to mixer 24, disconnects mixer 24 from line 14 during the transmission of each pulse of radio energy from transmitter 12 and disconnects transmitter 12 from line 14 during the intervals between the transmission of pulses. The purpose of the T-R switch is to protect the receiver components from the large pulses of energy produced by the transmitter and to conduct all the received energy to the receiving components. During the intervals between pulses, T-R switch 22 connects mixer 24 through line 14 to element 16. Mixer 24 is connected to local oscillator 26 and the output of mixer 24 is supplied to I-F amplifier 28. The output of amplifier 28 is passed to detector 32, the output of which is supplied to video amplifier 36.

T-R switch 21 is connected to line 13 and this switch together with mixer 23, local oscillator 25, I-F amplifier 27, and detector 31 are arranged in the same manner as the corresponding components connected to line 14 from transmitter 12.

Timer 10 also controls the operation of blanking pulse generator 39 which generates a square pulse, the leading edge of which approximately coincides in time with the trailing edge of the pulse of radio frequency energy transmitted by transmitters 11 and 12. The width of the pulse from generator 39 is determined by the bias received through line 38. Blanking pulse generator 39 may consist of a multivibrator, the width of the pulses of which is determined by a bias. Such circuits are well known, an example being shown on page 176 of "Ultra High Frequency Technique" by Brainerd, Koehler, Reich, and Woodruff, published in 1942 by D. Van Nostrand Company, Inc.

The bias fed to generator 39 through line 38 to control the amount of blanking may be determined by the following: (a) the elevational angle of antenna 17, (b) the azimuthal rotation of antenna 17, (c) manual control. The blanking bias may be determined by all three of the above controls, by any one of them or any combination of them as is necessary to obtain the desired elimination of ground clutter with various orientation of the scanning antenna.

A schematic method of determining the bias is shown in Fig. 1 where the bias is determined by all three of the above mentioned controls. The movable contactor of potentiometer 40 may be linked with antenna 17 so that it is adjusted in accordance with the elevation angle of the antenna. The movable contactor of potentiometer 41 is adjusted in accordance with the follower 44 resting on cam 43 turned in synchronism with the azimuthal rotation of antenna 17. Cam 43 is constructed to give follower displacements at various cam angles in accordance with the ground clutter indicated by tube 48 for corresponding azimuthal angle of antennas 17. Potentiometers 40 and 41 are so connected that their outputs are added and applied through rheostat 45 and line 38 to blanking pulse generator 39. The movable contactor of resistor 45 is manually adjusted by knob 46.

In the example, as shown, the control due to the elevation angle of the antenna is added to the control due to the azimuthal angle of the antenna and the sum is multiplied by the manual control. It is obvious that these controls may be added or multiplied in other combinations to give the desired resulting blanking bias.

The rectangular pulses from generator 39 are applied to blanking circuit 33 which also receives the output from detector 31. The blanking circuit 33 operates to suppress the output of detector 31 during the occurrence of a blanking pulse from generator 39 but, during the interval between blanking pulses, passes the output of detector 31 to video amplifier 35. Blanking circuit 33 may consist of an amplifier driven to cutoff by the pulses from generator 39. Timer 10 also controls the operation of sweep generator 47 which provides a sawtooth deflection wave for cathode ray tube 48. Tube 48 contains electron gun 49, control element 50, deflection plates 51, and fluorescent screen 52. The outputs of video amplifiers 35 and 36 are combined and applied to control grid 50.

In operation, timer 10 causes transmitters 11 and 12 periodically and simultaneously to transmit short pulses of radio frequency energy from radiating elements 15 and 16 respectively. Reflector 18 and radiating elements 15 and 16 may be so arranged that the energy from transmitter 11 forms a lower beam, narrow in elevation as shown in Fig. 2 at 54, while the energy from transmitter 12, the frequency of which differs from that of transmitter 11, forms an upper beam wide in elevation as shown in Fig. 2 at 55.

Reflections of the upper beam frequency are received by element 16 and conducted through T-R switch 22 to the mixer 24. These reflections are heterodyned with the local frequency from oscillator 26. The products of mixer 24 are amplified by I-F amplifier 28, detected in detector 32, and again amplified in video amplifier 36. Local oscillator 26 and the other receiving components in the receiving channel connected to T-R switch 22 are adjusted to receive only reflections of the frequency produced by transmitter 12. The output of amplifier 36 is applied to control grid 50 of display tube 48 where it causes a visible trace to appear on the screen 52 corresponding to each echo received. Sweep generator 47 causes the electron beam generated by gun 49 to sweep across screen 52 starting just at the beginning of each transmitted pulse so that the position of a trace on the screen 52 indicates the range of the reflecting object.

Reflections of the lower beam 54, Fig. 2, are received on element 15 and passed through T-R switch 21, mixer 23, I-F amplifier 27, and detector 31, which are tuned to the frequency of transmitter 11 and operate in a manner similar to the corresponding elements in the upper beam receiving channel described above.

The output of detector 31 is, however, blanked out in blanking circuit 33 for a brief interval immediately subsequent to the transmission of a pulse from transmitter 11. The length of this blanking period is arranged as explained above so that the reflections of the lower beam by nearby objects on the ground will be suppressed as desired. The output from detector 31, passing through blanking circuit 33, is amplified in video amplifier 35 and also impressed upon control grid 50 of tube 48.

This results in the exclusion from the display means of signals from the shaded area of the beam pattern shown in Fig. 2. It will be obvious from Fig. 2 that, since the upper and lower beams may overlap, the upper portion of the area covered by the lower beam may also be covered by the upper beam. Reflections from objects in the area covered by both beams will be indicated on the display means.

As reflector 18 is depressed in elevation, a larger portion of the lower beam will be reflected by objects on the ground and potentiometer 40 acts to increase the width of the blanking pulse accordingly. In a certain site the antenna may receive varying amounts of ground clutter in various angles of azimuth rotation. Cam 43 operating in conjunction with potentiometer 41 acts to increase the width of the blanking pulse as the antenna turns to an angle of azimuth in which it receives ground clutter over a greater portion of its range.

If the antenna is sited on a high level with the ground level falling away in all directions, a lesser portion of the range will include ground clutter than if the antenna were sited at a low level with the ground level rising in all directions. Therefore, rheostat 45 is provided to allow manual adjustment of the width of the blanking pulse. It will be understood that it may not always be desirable to suppress all reflections from ground objects. To eliminate the reflection from a distant mountain top might unduly restrict the area searched.

Figure 3:
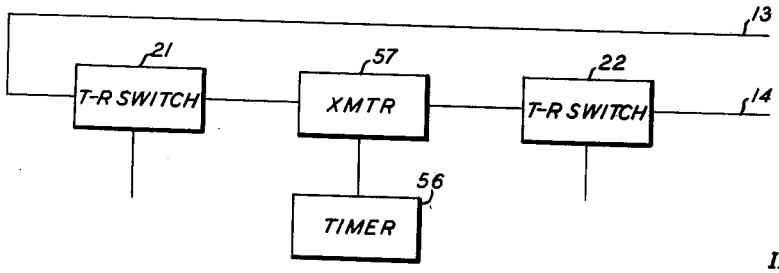
Fig. 3 is an alternative embodiment of a part of the system shown in Fig. 1.

There is shown in Fig. 3 an alternative embodiment of the invention in which the pulses of both beams are produced by a single transmitter. In this embodiment, timer 56 controls the operation of transmitter 57 so that the latter produces short pulses of radio frequency energy. These components may be substituted in the system of Fig. 1 so that transmitter 57 feeds pulses through T-R switches 21 and 22 and line 13 and 14 to radiating elements 15 and 16 respectively.

The upper radiating element 15, being arranged with respect to reflector 18 to transmit a lower beam, will accordingly be more sensitive to reflections from objects within the scope of the lower beam. The lower radiating element 16 will similarly be more sensitive to reflections from objects within the scope of the upper beam. Reflections from the upper beam will thus be passed through T-R switch 22 to mixer 24 and will be displayed on indicator tube 48 in the same manner as explained with respect to the apparatus shown in Fig. 1. In this embodiment local oscillators 25 and 26 will be adjusted so that both receiving channels will receive the frequency of transmitter 57. It is obvious that one local oscillator may be used to supply both mixers. Reflections from the lower beam will be passed through T-R switch 21 to mixer 23 and after being partially blanked, as explained with respect to the apparatus of Fig. 1, will be displayed as indicator tube 48.

In the embodiment of Fig. 3, since an object intercepting either beam will reflect radio energy in all directions, the effective pattern of both the upper and lower beam will be wider than shown in Fig. 2.

There is shown in Fig. 4, one method of producing an upper and lower beam. The lower beam is produced by large horn 60 which receives radio energy through wave guide 61 from a transmitter (not shown). Horn 60 includes adjustable fins 62 and 64 pivoted at points 63 and 65 respectively. The shape and strength of the lower beam may be adjusted by adjusting the positions of fins 62 and 64 about their respective pivots. A sectional view of horn 60 taken through line A—A is shown in Fig. 5.

The upper beam is formed by radiating assembly 66 which includes a linear dipole array comprising dipoles 67 fed by radio energy through wave guide 68 from a transmitter not shown. Wave guide 68 is terminated in a small horn 69. The construction of dipoles 67 may be as described in application by Lan Jen Chu and Lester Clare Van Atta, Serial No. 580,016, filed February 27, 1945, now abandoned.

It will be understood that while the antenna feed shown in Fig. 4 is particularly advantageous, it is not necessary to the practice of this invention since any method of feeding the antenna from a plurality of energy conducting means may be used. A plurality of dipole arrays or a plurality of horns or any combinations of radio-energy feeding means could be used.

It is thus seen that reflections from objects on the ground have been eliminated although the detection apparatus is fully sensitive to low flying targets and targets far from the apparatus. The detection apparatus is also fully sensitive to high flying targets near the apparatus. It will also be seen that this invention is especially advantageous in that the use of two transmitters provides a large vertical coverage angle without reducing the strength of the beam at the horizon where it is the most needed for long-range detection.

The embodiment of this invention shown in Fig. 1 using two transmitters is especially advantageous in that it provides for several transmitters to radiate power from the same reflector. Thus if the transmitting tube is the limiting factor with respect to power, additional power may be transmitted from the same reflector. The use of a plurality of transmitters each with a separate radiating element but using a single reflector also allows a more advantageous shaping of the beam pattern than is possible with one transmitter. It is also obvious that three or more transmitters may be used with one reflector with corresponding advantages.

It is also obvious that it is not essential for the practice of this invention, in the embodiment using more than one transmitter, that the transmitters produce pulses simultaneously. Arrangement of the display means so that each reflection would be properly displayed would allow any relation between the transmitting times of the transmitters.

Another advantage of the embodiment shown in Fig. 1 is in presentation on one display means of the complete picture of objects in the air. This eliminates the need for observing two indicating means and for identifying objects as they pass from one display means to another.

It is obvious that the system herein described for eliminating ground clutter may be used in conjunction with any system for displaying indications of the received echoes. Such display systems include Plan Position Indication (PPI), in which a radial trace extending from the center of the indicator screen to its periphery is rotated about said center in synchronism with the rotation of the radio antenna to show reflecting objects in polar coordinates of azimuth and range.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In radio object detection equipment, means for producing an upper beam of radio pulses, means for producing a lower beam of radio pulses, means for receiving reflected energy of said upper beam, means for receiving reflected energy of said lower beam, means for blanking the output of said second-named receiving means during a predetermined portion of the interval between pulses, means for adjusting the length of said interval in accordance with the elevation of said beams, and display means for indicating the unblanked outputs from both receiving means.

2. In radio object detection equipment, means for producing an upper beam of radio pulses, means for producing a lower beam of radio pulses, means for receiving reflected energy of said upper beam, means for receiving reflected energy of said lower beam, means for blanking the output of said second-named receiving means during a predetermined portion of the interval between pulses, means for adjusting the length of said interval in accordance with the angle azimuth of said beams, and display means for indicating the unblanked outputs from both receiving means.

3. In radio object detection equipment, means for producing an upper beam of radio pulses of a first frequency, means for producing a lower beam of radio pulses of a second frequency, means for receiving reflected energy of said upper beam, means for receiving reflected energy of said lower beam, means for blanking the output of said second-named receiving means during a predetermined portion of the interval between pulses, means for manually adjusting the length of said interval, and display means for indicating the unblanked outputs from both receiving means.

4. A transmitter producing short pulses of radio frequency energy, a plurality of means for conducting said energy to an antenna, means including said antenna for producing a plurality of beams, a like plurality of means for receiving reflected energy from each of said beams, means for blanking one of said receiving means to render it unresponsive to reflected energy from only one of said beams for a predetermined time immediately following each of said pulses, and means for indicating the unblanked output of all of said receiving means.

5. In combination, means for transmitting an upper beam of pulses of oscillatory energy at one frequency, means for transmitting a lower beam of pulses of oscillatory energy at a second frequency, means for receiving reflected energy of said upper beam, means for receiving reflected energy from said lower beam, means for blanking the output of said second-named receiving means for a predetermined time immediately following each of the transmitted pulses of said lower beam, and means for displaying an indication of the unblanked outputs from both receiving means.

6. Means for transmitting an upper beam of pulses of radio frequency, means for transmitting a lower beam of pulses of radio frequency, first means for receiving reflected energy of said upper beam, second means separate from said first means for receiving reflected energy of said lower beam, means for only suppressing the output of said second receiving means for a predetermined time immediately following each of the transmitted pulses of said lower beam, and means for indicating the unsuppressed outputs of both receiving means.

7. A system for detecting objects by reflected energy of radio pulses including means for producing a first beam of radio pulses of one frequency, means for producing a second beam of radio pulses of a second frequency, means for receiving reflected energy of both beams, means for suppressing a portion of the received reflected energy of only one of said beams and means for indicating the unsuppressed received reflected energy of both beams.

References Cited in the file of this patent

UNITED STATES PATENTS

| Number | Name | Date |
| --- | --- | --- |
| 2,112,282 | Fritz | Mar. 29, 1938 |
| 2,189,549 | Hershberger | Feb. 6, 1940 |
| 2,227,598 | Lyman et al. | Jan. 7, 1941 |
| 2,370,053 | Lindenblad | Feb. 20, 1945 |
| 2,403,622 | Tuska | July 9, 1946 |
| 2,406,316 | Blumlein | Aug. 27, 1946 |
| 2,412,702 | Wolff | Dec. 17, 1946 |
| 2,426,183 | Deloraine | Aug. 26, 1947 |
| 2,442,695 | Koch | June 1, 1948 |
| 2,455,265 | Norgaard | Nov. 30, 1948 |
| 2,455,673 | Hansell | Dec. 7, 1948 |
| 2,479,586 | Moore | Aug. 23, 1949 |
| 2,480,829 | Barrow | Sept. 6, 1949 |
| 2,532,566 | Millman | Dec. 5, 1950 |
| 2,534,329 | Wilkerson | Dec. 19, 1950 |
| 2,541,030 | Busignies | Feb. 13, 1951 |